United States Patent [19]

Upton, Jr.

[11] Patent Number: 4,846,574
[45] Date of Patent: Jul. 11, 1989

[54] RETROREFLECTED ANTILOCKING FEEDBACK

[75] Inventor: Robert W. Upton, Jr., Seminole, Fla.

[73] Assignee: Honeywell Inc., Minneapolis, Minn.

[21] Appl. No.: 507,618

[22] Filed: Jun. 24, 1983

[51] Int. Cl.[4] ............................................. G01C 19/64
[52] U.S. Cl. .................................................... 356/350
[58] Field of Search ......................................... 356/350

[56] References Cited

U.S. PATENT DOCUMENTS

| | | | |
|---|---|---|---|
| 3,323,411 | 6/1967 | Killpatrick | 356/350 |
| 3,382,758 | 5/1968 | Wang | 356/350 |
| 3,462,708 | 8/1969 | McClure | 356/350 |
| 3,528,029 | 9/1970 | Holmboe et al. | 356/350 |
| 3,533,014 | 10/1970 | Coccoli et al. | 356/350 |
| 3,612,690 | 10/1971 | Staats | 356/350 |
| 3,627,422 | 12/1971 | Chodorow | 356/350 |
| 3,697,181 | 10/1972 | Macek et al. | 356/350 |
| 3,715,562 | 2/1973 | Dendy et al. | 356/350 |
| 3,826,575 | 7/1974 | Walters | 356/350 |
| 4,123,162 | 10/1978 | Sanders | 356/350 |

*Primary Examiner*—Vincent P. McGraw
*Assistant Examiner*—S. A. Turner
*Attorney, Agent, or Firm*—Robert A. Pajak

[57] ABSTRACT

A ring laser is provided with at least one retroreflector external to the ring laser closed-loop path for redirecting energy extracted from one of the counterpropagating beams into the opposite traveling counterpropagating beam. The redirected energy is modulated so as to oppose the normal coupling between the counterpropagating beams which causes lock-in.

8 Claims, 1 Drawing Sheet

RETROREFLECTED ANTILOCKING FEEDBACK

BACKGROUND OF THE INVENTION

This invention relates to ring laser angular rate sensors, and more particularly to an apparatus for providing antilocking biasing.

Ring laser angular rate sensors are well known in the art of inertial navigational systems. Some examples of ring laser angular rate sensors are shown and described in U.S. Pat. Nos. 3,323,411, 3,373,650, 3,390,606, 3,467,472, and 4,152,071, all of which are assigned to the assignee of the present application. Ring laser angular rate sensors comprise a pair of laser beams which travel or propagate in opposite directions along a closed-loop path or cavity. Rotation of the sensor causes the frequency of the laser beams to change and exhibit a frequency difference which is proportional to the rotation rate of the sensor. However, at low rotation rates, the laser beams tend to "lock-in" to a common frequency. The "lock-in" phenomenon is thought primarily to be caused by backscattering of the laser beams along the closed-loop path, and particularly at the reflection surfaces defining the closed-loop path.

Research and development related to the ring laser angular rate sensor has been primarily directed to apparatuses and methods to avoid, reduce, or correct for the effects of lock-in. U.S. Pat. No. 3,323,411 recognized that the backscattering energy could be neutralized by introducing back into the cavity of closed-loop path a beam of energy equal in amplitude but opposite in phase to the sum of the undesirable reflections which cause the backscattering. Since opposite phase beams neutralize each other, the controlled redirected beam could cancel out the backscatter energy and thus minimize or prevent lock-in. U.S. Pat. No. 3,697,181 by Warren M. Macek also redirects energy back into the cavity, but the redirected energy is phase and amplitude controlled in response to amplitude modulation of the countertraveling laser beams which is a function of backscattering.

U.S. Pat. No. 3,373,650 takes an altogether different approach to minimizing the effects of lock-in. The U.S. Pat. No. 3,373,650 teaches the use of a mechanical rotation or dither which rotationally oscillates the sensor back and forth. This oscillation causes the frequencies between the two countertraveling laser beams to vary in direct relationship to the rotation rate caused by the mechanical dithering. Mechanical dithering is known to reduce lock-in substantially.

BRIEF DESCRIPTION OF THE INVENTION

A ring laser is provided with at least one retroreflector external to the ring laser closed-loop path for reflecting energy extracted from one of the counterpropagating beams into the opposite traveling counterpropagating beams. The redirected energy is continuously dithered or modulated so as to substantially obviate the effects of lock-in.

DETAILED DESCRIPTION OF THE INVENTION

Figure 1:
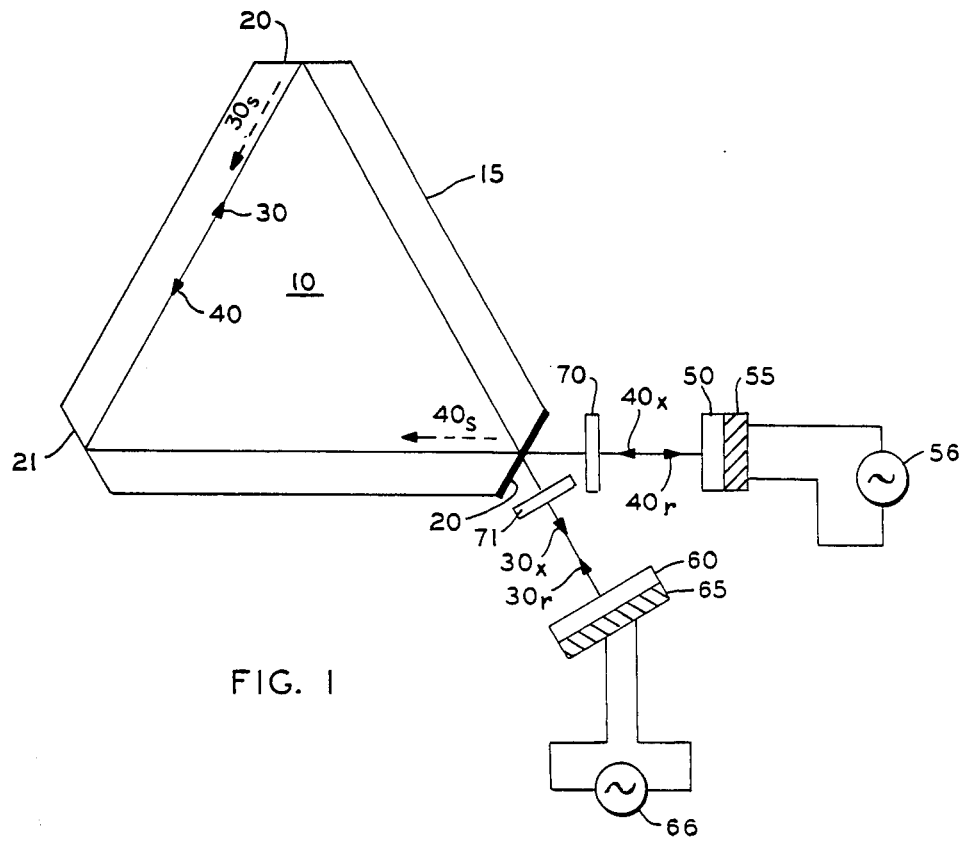
FIG. 1 is a schematic diagram showing one embodiment of the present invention.

FIG. 1 shows a schematic diagram of a laser angular rate sensor including the apparatus of the present invention. There shown is a ring laser angular rate sensor 10 comprising a cavity 15 which includes mirrors 20, 21, and 22 which define an optical closed-loop path. Laser beams 30 and 40 are generated to travel in opposite directions about the closed-loop path defined by mirrors 20, 21, and 22 in a well known manner.

Mirror 22 is shown to be partially transmissive thereby extracting a portion of laser beam 40 as designated by arrow 40x, and extracting a portion of laser beam 30 as designated by arrow 30x. Extracted beam 40x propagates along a path toward retroreflector 50 which in turn redirects a beam of energy designated by arrow 40r. Extracted beam 30x propagates along a path toward retroreflector 60 which in turn redirects a beam of energy designated by arrow 30r. Coupled to retroreflectors 50 and 60 are transducing means 55 and 65 respectively. Transducing means 55 is shown controlled by signal generator 56, and transducing means 65 is shown controlled by signal generator 66. Signal generators 56 and 66 may be the same generator, but may be phase separated.

Transducing means 55 and 65 may be by way of example a piezoelectric device which causes the point of reflection of beams 40x and 30x to move in a direction parallel to the path traversed by beams 40x and 30x respectively. The operation of the embodiment of the invention shown in FIG. 1 will now be described.

Normal scattering energy from beam 40 into the direction of beam 30 is illustrated in FIG. 1 by a wave designated 40s; and scattered energy from beam 30 into beam 40 is designated by a wave 30s. As a result of retroreflector 50, beam 40r is injected back into the closed-loop path so as to travel substantially coaxial with laser beam 30 and beam 40s. If beam 40r is unattenuated, beam 40r will be more significant than beam 40s. Therefore, the lock-in rate of the sensor system 10 will be directly related to the energy injected into the closed-loop path, namely, beam 40r.

Application of a sinusoidal voltage to transducing means 55 will vary the position of the retroreflector 50 and cause the phase of beam 40r to vary or modulate. If transducing means 50 is capable of varying the position of retroreflector 50± one-half of a wave length of the laser light beam, the phase of the laser beam 40r will vary ±π radians. Furthermore, if the signal means 56 is sinusoidal, then beam 40r will sinusoidally vary in phase ±π radians. Because of the modulating phase of the retroreflected beam 40r, the two laser beams will be unlocked for a majority of the time during the low rotation rates. The behavior of the beams due to a modulating phase of beam 40r is somewhat analogous to a modulated frequency difference caused by mechanical dither. The total variation of phase change is not critical but it is desired to be greater than π radians.

Depending upon the quality of the retroreflection system, it may be necessary to pass beams 40x and 40r through an attenuator 70 having a control input (not shown). The purpose of attenuator 70 is to reduce the amount of energy of beam 40r returned into the closed-loop path so as to have a magnitude somewhat greater than the backscattered energy beam 40s. A factor of 10 is not unreasonable.

In a similar manner, retroreflector 60 provides beam 30r so as to be redirected into the closed-loop path to travel substantially coaxial with laser beam 40. Attenuator 71 provides attenuation like attenuator 70. Application of a sinusoidal voltage to transducing means 65 varies the position of retroreflector 60 causing unlocking of the laser beams.

In some circumstances it may be desirable to provide both retroreflected beams 30r and 40r concurrently so as to be the primary scattering waves traveling in opposite directions. Sinusoidally varying these waves will therefore sinusoidally vary lock-in and thus produce an overall lock-in reduction, and thereby improve the performance of the sensor by use of a single modulated retroreflected beam.

The system as just described provides a mechanization for preventing mode locking using modulated retroreflected energy. Either retroreflected beam 30r or 40r may be utilized to prevent mode pulling thus avoiding lock-in.

Figure 2:
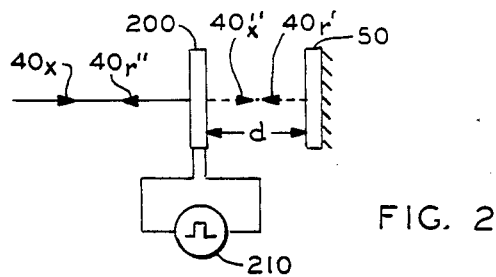
FIG. 2 is a schematic diagram showing an embodiment of the present invention employing an optical filter.

The embodiment shown in FIG. 1 may be implemented in a somewhat different fashion as illustrated in FIG. 2. Shown in FIG. 2 is beam 40x which impinges upon a switched optical filter 200. Filter 200 is electrically controlled by control oscillator 210. When no voltage is applied to filter 200, the filter is transmissive, and beam 40x transmits through filter 200 as designated by beam 40x'. Beam 40x' traverses a path length "d" so as to impinge upon a retroreflecting means 50 thereby providing a retroreflected beam 40r'. Beam 40r' is redirected back through filter 200 back into the cavity similar to beam 40r as illustrated in FIG. 1. On the other hand, when a sufficient voltage is applied to filter 200 by means 210, filter 200 becomes reflective and thereby acts as a retroreflection means causing a retroreflected beam 40r''. Beam 40r'' is redirected into the closed-loop path similar to beam 40r illustrated in FIG. 1.

In operation, the apparatus as shown in FIG. 2 provides redirected beam of energy into the closed-loop path having a varying phase as controlled by oscillator 210 and the distance between filter 200 and retroreflection means 50. The change in length between filter 200 and retroreflection means 50 causes a phase change in the beam redirected into the closed-loop path. The phase is dependent upon the total path length 2d, and must be less than an integral number of wave lengths of the laser beam. It is desirable that 2d should be "$n+\frac{1}{2}$" wave lengths where n is an integer. The behavior of the system is that as already described, namely, the varying phase forces the two laser beams to be unlocked because of the frequency unlocking action of the retroreflected energy.

As is well known, the retroreflection means 50 may be provided by a variety of apparatuses including, among others, phase conjugate mirrors and corner cube prisms and the like. It should be understood, therefore, that various changes and modifications of that shown in FIGS. 1 and 2 described herein will be apparent to those skilled in the art. Such changes and modifications can be made without departing from the spirit and scope of the present invention and without diminishing its advantages.

The embodiments of the invention in which an exclusive property or right is claimed are defined as follows:

1. A ring laser angular rate sensor comprising:
   means for generating first and second laser beams in opposite directions along a closed-loop path;
   means for extracting a portion of said first laser beam from said closed-loop path; and
   first redirecting means for redirecting said extracted portion of said first laser beam to travel along said closed-loop path in the direction of said second laser beam, said redirecting means further including means for continuously dithering, advancing and retarding, the phase of said redirected first laser beam portion.

2. The apparatus of claim 1 further comprising amplitude control means for controlling the amplitude of said redirected first laser beam portion.

3. The apparatus of claim 1 further comprising:
   means for extracting a portion of said second laser beam from said closed-loop path; and
   second redirecting means for redirecting said extracted portion of said second laser beam to travel along said closed-loop path in the direction of said first laser beam, said second redirecting means further including means for continuously dithering, advancing and retarding, the phase of said redirected second laser beam portion.

4. The apparatus of claim 1 wherein said first redirecting means includes,
   retroreflection means,
   transduction means coupled to said retroreflection means for varying the position of said retroreflection means with respect to said closed-loop path, and
   signal means electrically connected to said transduction means for oscillating said position of said retroreflection means.

5. The apparatus of claim 1 wherein said first redirecting means includes,
   optical means capable of wave reflection,
   wave reflecting means,
   said optical means and second wave reflecting means being in the path of said extracted portion of said first laser beam, and
   means for alternately reflecting said extracted portion of said first laser beam from said optical means and said wave reflecting means.

6. The apparatus of claim 5 wherein said optical means is capable of being selectively reflective and transmissive in response to a control voltage presented thereto, said extracted portion of said first laser beam capable of being first transmitted through said optical means before being reflected from said wave reflecting means.

7. The apparatus of claim 1 wherein said redirected first laser beam portion travels along said closed-loop path substantially coaxial with said second laser beam.

8. A ring laser angular rate sensor comprising:
   means for generating first and second laser beams in opposite directions along a closed-loop path;
   means for extracting a portion of said first laser beam from said closed-loop path; and
   first redirecting means for redirecting said extracted portion of said first laser beam to travel along said closed-loop path in the direction of said second laser beam, said redirecting means further including means for continuously dithering, advancing and retarding, the phase of said redirected first laser beam portion in accordance with a periodic signal.

* * * * *